US012795792B2

(12) United States Patent
Santana Arnaiz et al.

(10) Patent No.: US 12,795,792 B2
(45) Date of Patent: Nov. 10, 2026

(54) PSU COMPATIBLE LOAD ADAPTION

(71) Applicant: SIGNIFY HOLDING B.V., Eindhoven (NL)

(72) Inventors: Octavio Alejandro Santana Arnaiz, Eindhoven (NL); Karnekumar Arulandu, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 38 days.

(21) Appl. No.: 19/113,002

(22) PCT Filed: Sep. 21, 2023

(86) PCT No.: PCT/EP2023/076088
§ 371 (c)(1),
(2) Date: Mar. 19, 2025

(87) PCT Pub. No.: WO2024/062042
PCT Pub. Date: Mar. 28, 2024

(65) Prior Publication Data

US 2026/0101423 A1 Apr. 9, 2026

(30) Foreign Application Priority Data

Sep. 22, 2022 (EP) .................................... 22197102

(51) Int. Cl.
*H05B 45/14* (2020.01)
*H02M 3/156* (2006.01)
(Continued)

(52) U.S. Cl.
CPC .................................... *H05B 45/14* (2020.01)

(58) Field of Classification Search
CPC ....... G09G 2320/029; G09G 2320/043; G09G 2320/0666; G09G 2330/021; G09G 3/14;
(Continued)

(56) References Cited

U.S. PATENT DOCUMENTS 7,105,947 B1 9/2006 Marshall et al.
9,220,133 B2 12/2015 Salvestrini et al.
(Continued)

FOREIGN PATENT DOCUMENTS

WO 2021244916 A1 12/2021

*Primary Examiner* — Wei (Victor) Y Chan

(57) ABSTRACT

The invention relates to a load module for connecting to a power supply having a maximum power capability. The load module comprises an input for receiving an input voltage from the power supply, a power regulator adapted to receive the input voltage and adapted to provide a regulated power to a load, a current sensor for sensing a current provided by the power supply, a voltage sensor for sensing the input voltage and a controller for controlling the power regulator. The controller is arranged to operate in a configuration mode, wherein the controller is arranged to control the power regulator to draw a current from the input that gradually increases until the input voltage drops, wherein the current at which the input voltage drop is indicative of a the maximum power capability of the power supply, wherein the controller is arranged to determine the maximum power capability of the power supply based on the sensed current and the sensed input voltage close to the event that the input voltage drops.

11 Claims, 5 Drawing Sheets

(51) Int. Cl.
*H05B 45/00* (2022.01)
*H05B 45/3725* (2020.01)
*H05B 45/385* (2020.01)

(58) Field of Classification Search
CPC .. H05B 45/10; H05B 45/3725; H05B 45/385; H05B 45/20; H05B 47/17; H05B 45/38; H05B 45/46; H05B 45/34; H05B 45/44; H05B 45/325; H05B 45/18; H02M 1/081; H02M 3/156; H02M 3/33507; H02M 7/2176; H02M 1/08; H02M 3/155; H02M 7/217
See application file for complete search history.

(56) References Cited

U.S. PATENT DOCUMENTS

| | | | | |
|---|---|---|---|---|
| 2017/0208658 | A1 | 7/2017 | Yseboodt et al. | |
| 2018/0063928 | A1* | 3/2018 | Hick | H04L 12/10 |
| 2018/0249544 | A1 | 8/2018 | Hagelaar et al. | |
| 2020/0205259 | A1 | 6/2020 | Hagelaar et al. | |
| 2021/0259077 | A1* | 8/2021 | Squillace | H05B 45/46 |

* cited by examiner

PSU COMPATIBLE LOAD ADAPTION

CROSS-REFERENCE TO PRIOR APPLICATIONS

This application is the U.S. National Phase application under 35 U.S.C. § 371 of International Application No. PCT/EP2023/076088, filed on Sep. 21, 2023, which claims the benefit of European Patent Application No. 22197102.1, filed on Sep. 22, 2022. These applications are hereby incorporated by reference herein.

FIELD OF THE INVENTION

The invention relates to a load module for connecting to a power supply having a maximum power capability. The invention further relates to a system. The invention further relates to a method for determining a maximum power handling capability of a power supply.

BACKGROUND OF THE INVENTION

A power supply is normally used to provide a defined power to a load. The power supply and the load are separate units and can therefore be provided by different suppliers. At first, the power supply and the load may have matched power ratings. E.g., a load consuming a maximum of 30 W may be coupled to a power supply that has a power rating of 30 W. Over time, the load may change. Additional loads may be connected to the power supply. Alternatively, the load may be replaced by another load. The power consumption of the load may therefore change i.e. increase or decrease. The event of an increasing load may cause problems in the lighting system e.g. The power supply may not be able to operate at this new power level. The power supply may therefore need replacement by a power supply that can provide more power. This requires additional actions to be undertaken and sometimes unnecessary replacement of a good working power supply.

Another situation may arise when the power supply is replaced by an unknown driver. The installer may not always know if the replacement power supply can deliver enough power to the load. The installer may use a power supply that is significantly over dimensioned to reduce the risk of a power mismatch between the power supply and the load.

It is desired to provide a way to determine that the same components can be reused instead of performing a preventive replacement of components or introduce an unnecessary over dimensioning of e.g. the power supply.

SUMMARY OF THE INVENTION

It is an objective of the invention to provide a load module that is capable of determining what the maximum power capability of the power supply is to which the load module is connected.

To overcome this concern, in a first aspect of the invention, a load module, for connecting to a power supply having a maximum power capability, is provided, the load module comprising:

- an input for receiving an input voltage from the power supply;
- a power regulator adapted to receive the input voltage and adapted to provide a regulated power to a load;
- a current sensor for sensing a current provided by the power supply;
- a voltage sensor for sensing the input voltage; and
- a controller for controlling the power regulator,
- wherein the controller is arranged to operate in a configuration mode, wherein the controller is arranged to control the power regulator to draw a current from the input that gradually increases until the input voltage drops, wherein the current at which the input voltage drop is indicative of a the maximum power capability of the power supply, wherein the controller is arranged to determine the maximum power capability of the power supply based on the sensed current and the sensed input voltage close to the event that the input voltage drops.

A load module is designed to be coupled to a power supply. The power supply has a maximum power capability. The maximum power capability determines the maximum power that the power supply can provide without resulting in damaging the power supply. Exceeding this maximum power capability may result in the power supply to reduce its output power resulting in less power that can be provided to the load module. Exceeding the maximum power capability can be done by drawing a too large current. This can for example happen when the load draws too much current. It is therefore desired to understand if the power supply can provide the maximum power that may be drawn by the load. The load module has a detection circuit that is used to determine the maximum power that can be drawn from the power supply. The load module has a current sensor for sensing the current drawn form the power supply. The load module also has a voltage sensor that senses the voltage provided by the power supply. A controller may receive a current signal from the current sensor and a voltage signal from the voltage sensor. The current signal from the current sensor may be a representation of the current provided by the power supply. The voltage signal from the voltage sensor may be a representation of the voltage provided by the power supply. Preferably, the power supply provides a constant voltage, or the power supply acts as a voltage source. The load module has a power regulator that regulates the power through a load. The power regulator receives the input voltage provided by the power supply. The controller is arranged to operate in a configuration mode. In this mode, the controller controls the power regulator to draw a current from the input that gradually increases until the input voltage drops. Preferably, the current to start with is a 0 A, so the power regulator starts building up a current from 0 A up to a current level that corresponds to the level where the input voltage drops. The controller determines the maximum power capability of the power supply based on the sensed current and the sensed input voltage that were present at the event that the input voltage drops. The closer the measurement is done to the event of the voltage drop, the more accurate the maximum power capability may be determined.

In a further example, the controller is arranged to set a maximum power that can be drawn by the load module at 80% of the maximum power capability of the power supply.

Upon determining the maximum power capability, the controller may provide a derating margin from the maximum power capability. Preferably, this margin is set at 80% of the maximum power capability. E.g., if a maximum power capability of a power supply is determined at 100 W, the controller may allow a maximum of 80 W to be consumed by the load module.

In a further example, the controller is arranged to operate in the configuration mode when the power supply starts providing the input voltage to the load module.

Preferably, the controller operates in the configuration mode when the power supply starts up. At start up, the power supply provides the voltage to the load module and the controller then determines the maximum power capability of the power supply. After the determination, the load module may allow the regulated power to the load to be provided.

In a further example, the power regulator comprises a current drawing circuit adapted to draw the current from the input that gradually increases until the input voltage drops, such that no current flows through the load during the configuration mode.

The power regulator may have a dedicated current drawing circuit that provides a path for the current to be drawn without having the current flow through the load during the configuration mode. The load will not be powered during the configuration mode and therefore, no undesired effects caused by the load may occur during the configuration mode.

In a further example, the current drawing circuit comprises a variable resistor between the input and a return path to the power supply.

In a preferred example, the addressable LED load is connected between the output terminals of the controller. During power up, the controller detects the number of nodes connected to the controller by means of the control signal such that a change in load can be detected without applying full power to the LED load. Shortly after power up, the controller increases the output power.

A preferred example of a current drawing circuit may have a variable resistor that is placed between the input and a return path to the power supply. The variable resistor may in that sense shunt or bypass the load. The variable resistor may have a resistance that is reduced over time as to provide the current from the input that gradually increases until the input voltage drops.

In a further example, the controller is arranged to control a resistance of the variable resistor during the configuration mode and wherein the controller is adapted to prevent any current from flowing through the variable resistor when the controller is operating in a normal operating mode.

The controller preferably controls the resistance of the variable resistor during the configuration mode and after the configuration mode, sets the variable resistor such that no or a very little amount of current can flow through the variable resistor. This may be done by disconnecting the variable resistor from the input or return path using a switch.

In a further example, the power regulator is adapted to, during the configuration mode, draw the current from the input that gradually increases until the input voltage drops, wherein the current flows through the load.

If the load permits, no additional dedicated current drawing circuit may be needed. The power regulator draws the current through the load. For a short moment in time, this may result in an overloading of the load, but this may be acceptable and not harmful because the load may withstand such overload for a short amount of time.

In a further example, the load has a maximum current handling capability, wherein the controller is arranged to stop increasing the current when the current exceeds the maximum current handling capability of the load.

If the current that is increasing exceeds the maximum current handling capability of the load, the load module needs to protect the load to prevent it from being damaged. This can be done if the overloading of the load occurs for a too long period. The controller is arranged to stop increasing the current when the current exceeds the maximum current handling capability of the load. The maximum power capability of the power supply may then be significantly larger than the maximum current handling capability of the load. The maximum power capability of the power supply can in this case then not be determined. The controller may however conclude that the power supply is capable of providing enough power for the load. Since the overloading of the load is taken into consideration, the power supply will also provide enough power for the load when taking the derating of e.g. 80% into consideration.

In a further example, the controller comprises a memory adapted to store the maximum power capability of the power supply.

Preferably, the controller is capable of storing the maximum power capability of the power supply. This may allow the controller to further process the data. The data may for example be shared with a power system. The data may also be used to determine if more loads may be added to the load module.

In a further example, the load module comprises the load.

The load can be integrated in the load module. This allows the circuit for determining the maximum power capability of the power supply and the load to be integrated into a single design.

In a further example, load is a lighting load.

In a further example, the lighting load is a semiconductor lighting load.

Preferably, the load is a lighting load. Even more preferred, the lighting load is a semiconductor lighting load. The semiconductor lighting load can be connected to power supply acting as a driver such as a light emitting diode, LED, driver. The driver may be replaced by another driver with a different power capability. To make sure that the driver will not be overloaded by the lighting load, the load module can determine how much power the driver can provide.

In a further example, a system is provided. The system comprises the load module according to any of the preceding examples and the power supply.

In another example, a method for determining a maximum power handling capability of a power supply is provided, the method comprises the steps of:
- coupling a load module to the power supply such that the load module is adapted to receive power from the power supply;
- drawing a current from the power supply;
- gradually increasing the current until a voltage provided by the power supply drops below a threshold;
- determining the voltage and the current provided by the power supply when the voltage drops below the threshold to determine the maximum power handling capability of the power supply.

In another example, a power consumption of the load module is prevented to exceed the maximum power handling capability of the power supply.

BRIEF DESCRIPTION OF THE DRAWINGS

Examples of the invention will now be described with reference to the accompanying drawings, in which.

DETAILED DESCRIPTION OF THE EMBODIMENTS

Figure 1:
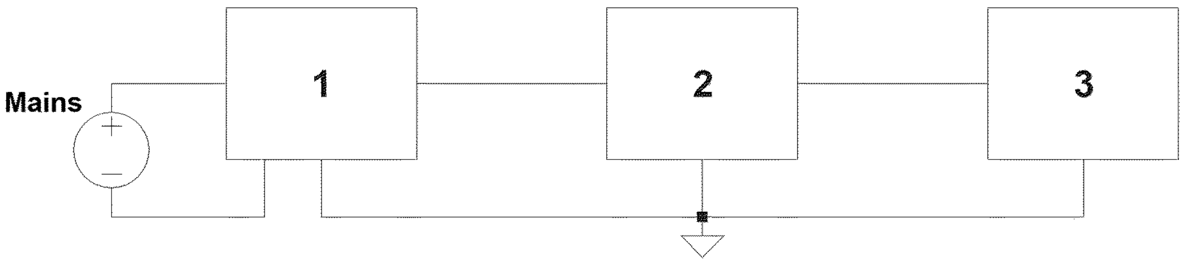
FIG. 1 shows an example of a system having a power supply, a load module and a load.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should also be understood that the Figures are merely schematic and are not drawn to scale. It should also be understood that the same reference numerals are used throughout the Figures to indicate the same or similar parts.

FIG. 1 shows an example of a system. The system has a power supply 1. The power supply 1 receives a voltage from an external power source. The power source may be mains and a main voltage Mains may be provided to the power supply 1. The power supply 1 converts the mains voltage Mains into an input voltage. This voltage may be a regulated stable voltage at e.g. 12 V or 24 V. Alternatively, the power supply may provide any regulated voltage level, also a voltage level that is larger than the mains voltage Mains. The voltage that is generated by the power supply 1 is provided to the load module 2. The load module 2 has an input IN through which the load module 2 receives the voltage generated by the power supply 1 as an input voltage. The load module 2 has a power regulator 5 that receives the input voltage and converters this input voltage into regulated power that is provided to the load 3. The load module 2 has a current sensor R1, R5 and a voltage sensor 6. The load module 2 has a controller 4 that receives a sensed current signal from the current sensor R1, R5. The controller 4 also receives a sensed voltage signal from the voltage sensor 6. The controller 4 may be used to control the power regulator 5 to provide the regulated power to the load 3. The controller 4 may operate in a configuration mode. In the operation mode, the controller 4 controls the power regulator 5 to draw a current from the input IN, i.e. from the power supply 1, that gradually increases until the input voltage drops. Preferably, the power regulator 5 starts with 0 A and gradually increases the current. Starting at 0 A ensures that at the start of the moment of drawing the current, the power supply 1 can certainly provide the required power. Other values than 0 A can also be used. While the power supply 1 can provide the power required during the gradual increase of the current, the input voltage will not fluctuate much, a small voltage ripple may however be present. Under gradually increasing the current, an increase of current over time could be understood. Preferably, the increase of current over time occurs in a linear fashion, but the current can also be increased non-linear. The current keeps on increasing gradually, and therefore also the power provided by the power supply 1, and as long as the power supply 1 can maintain this power to be supplied to the load module 2, the voltage remains stable. When the current increase further, the power supply 1 will eventually be unable to maintain the voltage stable since the power supply 1 is unable to provide this amount of power. The voltage will drop because of the power supply 1 being unable to maintain the power to be provided to the load module 2. This moment in time is an indication that the power supply 1 cannot provide the power that is required or drawn by the load module 2. The current sensed by the current sensor R1, R5 and the voltage sensed by the voltage sensor 6 at the moment that the voltage drops can be used as a determination of the maximum power capability of the power supply 1. A multiplication of the current sensed by the current sensor R1, R5 with the voltage sensed by the voltage sensor 6 at the moment that the voltage drops, provides the power at the moment that the voltage drops, which provides a good indication of the maximum power capability of the power supply 1. Preferably, this maximum power capability of the power supply 1 is stored in a memory. Preferably, the increase in the current does not happen too fast. When the current is high enough that the input voltage starts to drop, it is desired that this voltage drop is caused by the incapability of the power supply 1 to meet the power requirements of the load module 2. Since there may be some capacitances, there may be a delay between the response to the input voltage and the increasing current. The capacitances may hold up the input voltage for a period of time where the power supply 1 is already past its maximum power capability. Preferably, the increase of the current is at such a rate that the capacitances are discharged such that at the determination moment in time of the maximum power capability of the power supply 1, the difference between the actual maximum power capability and the determined maximum power capability is as low as possible. To ensure that the load module 2 does not draw too much power from the power supply 1, a derating may be introduced. Upon establishing the maximum power handling capability, a derating of e.g. 80% may be introduced. This means that the load module 2 will not draw more than 80% of the maximum power that can be drawn from the power supply 1. The derating may also apply for the load module 2 and the load 3.

Figure 2:
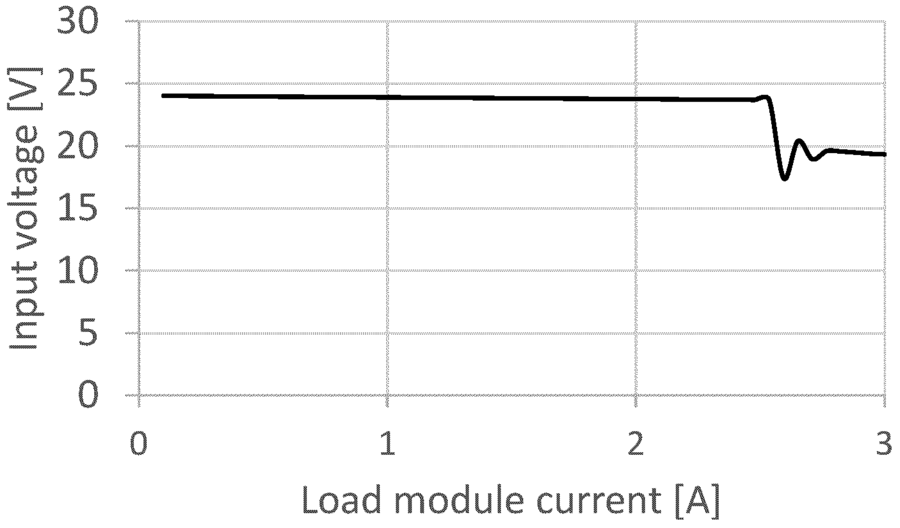
FIG. 2 shows an example of a voltage versus current graph for a power supply.

FIG. 2 shows an example of a graph showing how the determination of the maximum power capability can be determined. In the example provided, the power supply 1 provides an input voltage of 24 V to the load module 2. Up to a current of 2.5 A, the input voltage to the load module 2 does not change significantly. Only after 2.5 A. Gradually increasing the current from 0 A to 2.5 A will therefore not cause a drop in the input voltage. The maximum power capability is therefore not reached. After increasing the current above 2.5 A, close to 2.55 A, the input voltage drops. This is the moment that the controller 4 determines that the maximum power capacity has been reached. In this example, the maximum power capability of the power supply 1 may be determined to be 2.55×24 V=61.2 W. In this example, the input voltage level that is used for determining the maximum power capability is 24 V. However, since the input voltage drops, this voltage may also be lower e.g. 23 V.

Figure 3:
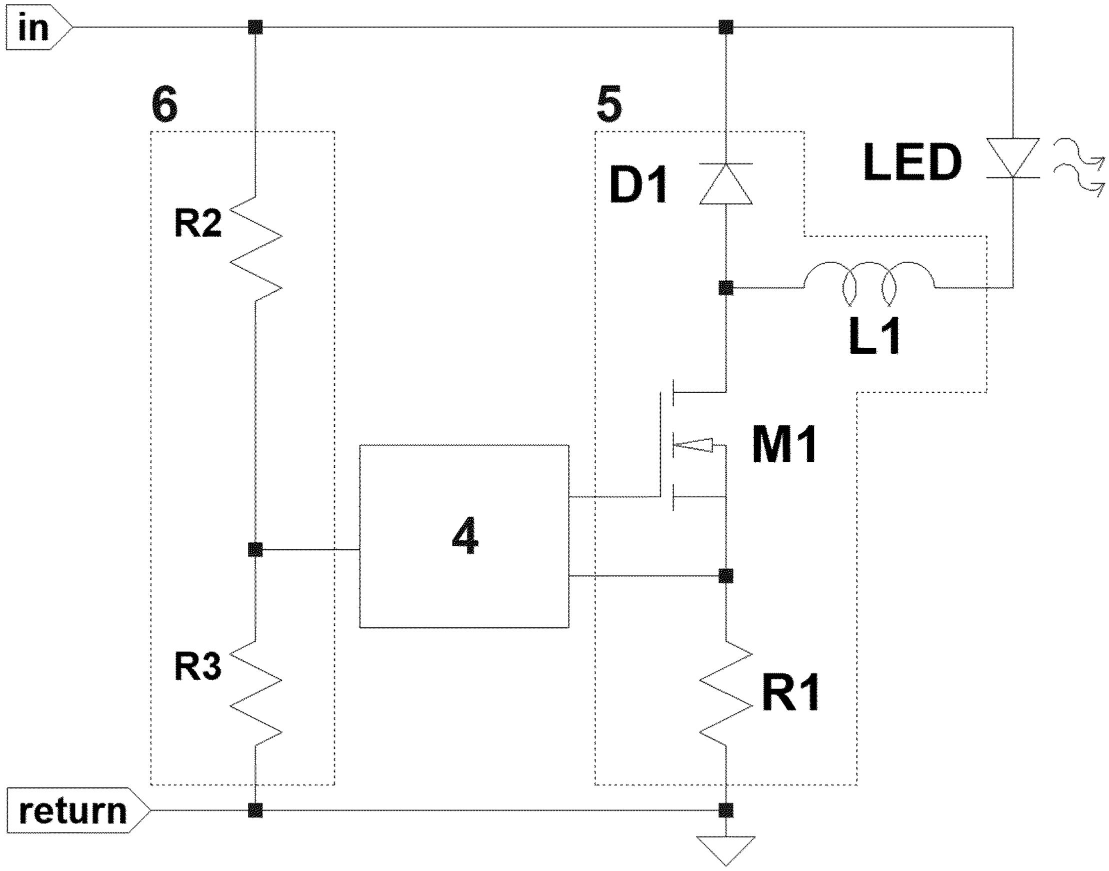
FIG. 3 shows an example of a load module.

FIG. 3 shows a detailed example of the load module 2. The load module 2 has an input IN that is coupled to the output of the power supply 1. The input voltage is provided to the load module 2 via the input IN, and preferably an input return RETURN. A voltage sensor 6 is provided to sense the input voltage. In this example the voltage sensor 6 is placed between the input IN and a return path RETURN. The output of the voltage sensor 6 is coupled to an input IN of the controller 4 and provides a signal being a representation of the input voltage. The load module 2 also has a current sensor R1. The current sensor R1 is used to sense the current that is drawn from the input IN. The current is provided by the power source 1. An output of the current sensor R1 is coupled to an input of the controller 4. The load module 2 has a power regulator 5, which is in this example a buck converter. The buck converter has an inductor L1, a switching element M1 and a freewheel diode D1. The buck converter may be coupled to the load LED In this example, the current sensor R1 is used for sensing the current flowing through the load LED. In this example, the power regulator 5 is used for regulating the power to the load LED. In addition, the power regulator 5 is used for drawing the current that gradually increases during the configuration mode. The current that gradually increases during the configuration mode flows through the load LED. The load LED has a maximum current capability. If the power source 1 has a maximum power capability that causes the current through the load LED to exceed the maximum current capability of the load LED, the load LED may be overloaded, resulting in damaging the load LED. If the configuration mode is short enough, this may not be a problem since the load LED may be able to withstand an overloading for a short time duration, e.g. in the range of milliseconds, without damaging the load LED. It may however occur that the maximum power capability exceeds the maximum current capability significantly. Even during a small time duration, the current through the load LED may be high enough to damage the load LED. To avoid the load from being damaged, the gradual current increase needs be stopped when the maximum current handling capability of the load. Therefore, when the maximum power capability of the power supply 1 and the maximum current capability of the load LED are within an acceptable range, the power regulator 5 may be able to determine the maximum power capability of the power supply 1. When at least one of the maximum power capability of the power supply 1 and the maximum current capability of the load LED is outside this acceptable range, the power regulator 5 is not able to determine the maximum power capability of the power supply 1 in order to prevent the load LED from being damaged. The skilled person will understand that the maximum current capability of the load LED during the configuration mode is larger than the maximum current that will be provided during a normal operation of the load LED because of the time duration that the current flows through the load LED. The maximum current capability of the load LED may then be based on the current that flows through the load LED during the configuration mode.

Figure 4:
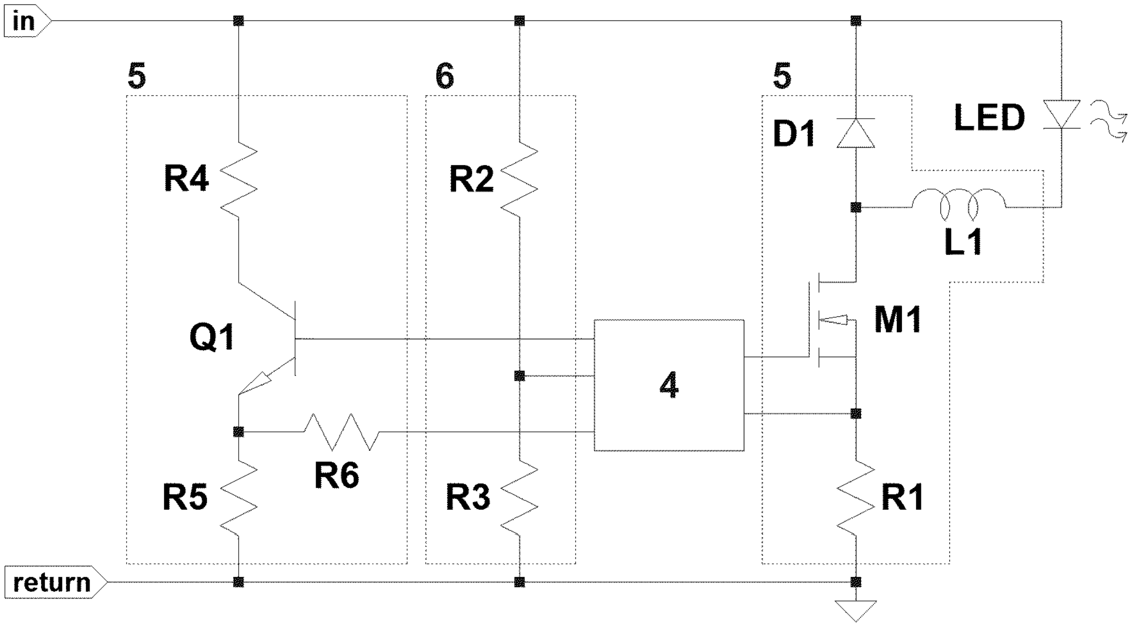
FIG. 4 shows another example of a load module.

FIG. 4 shows another detailed example of a load module 2. A similar voltage sensor 6 may be used as with the detailed example shown in FIG. 3. The voltage sensor 6 may be comprised of a first resistor R2 and a second resistor R3. The resistors act as a voltage divider such that a voltage can be provided to the controller 4 which is in an acceptable voltage range for the controller 4. The power regulator 5 is divided in two parts. The first part is for providing the regulated power to the load LED. This part is shown as a buck converter. The buck converter receives the input voltage from the input IN and converts this input voltage into a regulated voltage across the load LED, while regulating the current through the load LED. In the example provided, the regulation is done based using a current feedback. A current sensor R1 is used for regulating the current through the load LED.

The second part of the power regulator 5 is used to provide a path for the gradually increasing current to flow such that no current will flow through the load LED. This allows during the configuration mode, the load LED to remain inactive while the maximum power capability can be determined. The second part may be a current drawing circuit. The current drawing circuit may have a resistor R4, a switching element Q1 and a resistor R5 in a series connection. The series connection may be coupled between the input IN and the return path RETURN. The resistor R5 may be used for sensing the current through the series connection. The voltage drop across the resistor R5 is provided via resistor R6 to a controller 4. The controller 4 therefore has knowledge of the current flowing through the current drawing circuit. The controller 4 has a control output for controlling the switching element Q1. The controller 4 may control the switching element Q1 to operate in its linear operating mode. The controller can therefore control the total resistance or impedance of the series connection. This allows the controller 4 to control the current flowing through the series connection, allowing the current to be increased gradually, until the input voltage drops.

The switching element is shown as a bipolar transistor, but other switch types can also be considered such as a MOSFET.

Figure 5:
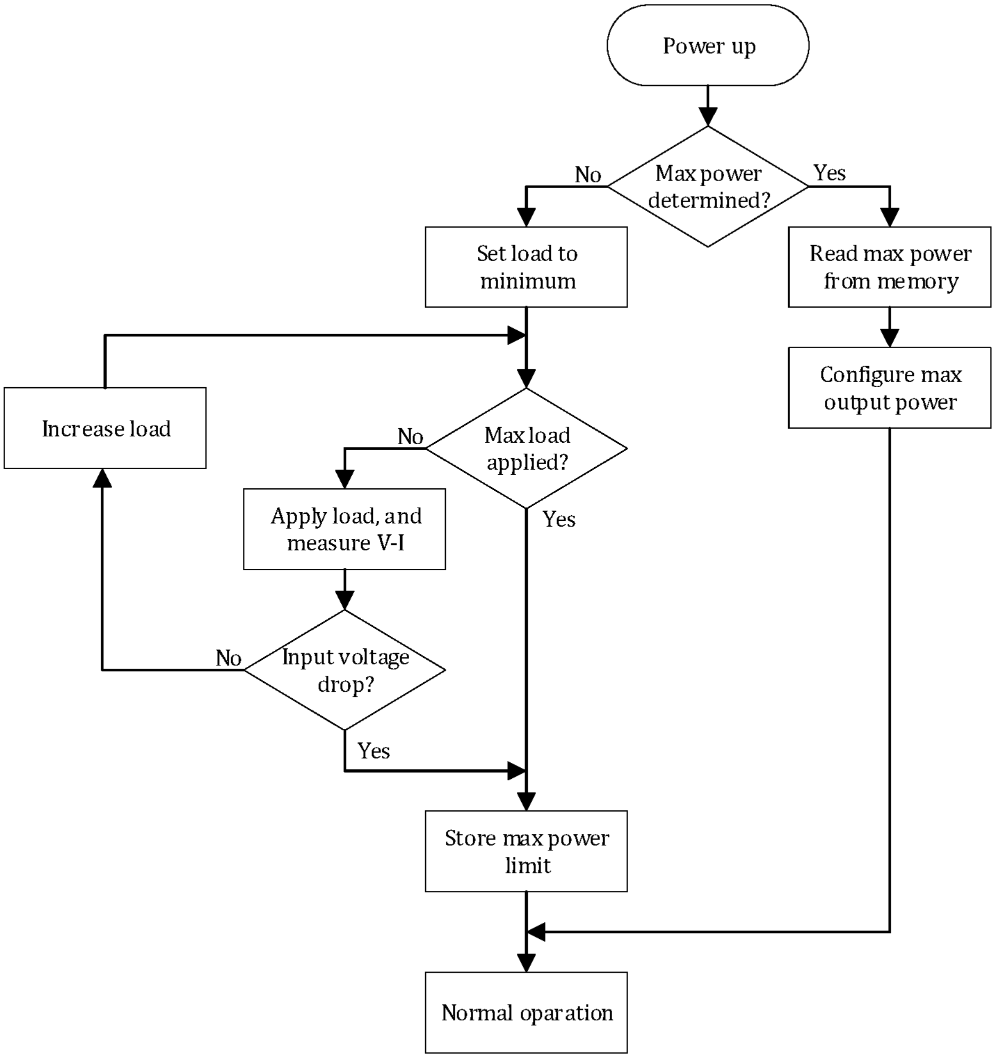
FIG. 5 shows a method of determining the maximum power capabilities of the power supply.

FIG. 5 shows an example of a method of determining the maximum power capability. The method relates to a method for operating an LED strip. In this example, the load LED is an LED strip that can be changed in length. The length can be increased resulting in a larger load or the length can be reduced, resulting in a smaller load. The first step is to power up the system. The system may comprise the power supply 1, the load module 2 and the load 3.

The load module 2 is arranged after the power up to determine the size of the LED string as to determine the maximum power that can be drawn by the load 3. If the load module 2 has already performed the maximum power capability of the power supply 1, and this value is stored in a memory, the maximum output power can be configured for the load 3. When the maximum power capability is not stored, the maximum power capability needs to be determined. Preferably, the current to be drawn from the power supply 1 is set to its minimum, preferably 0 A. The input voltage and the current provided by the power supply 1 are measured by the load module 2, preferably using a voltage sensor 6 and a current sensor R1, R3. The current is gradually increased over time until the input voltage drops. This moment in time, with the corresponding measured current and input voltage indicates that the power supply has been overloaded, i.e. reached its power limit. This maximum power capability of the power supply 1 can be stored in a memory so that when there are no changes to the LED string, no determination at start-up needs the be done. The configuration mode can then be omitted. After determining the maximum power capability of the power supply 1, the maximum current capability of the load 3 can be reduced to provide a safe derating. The maximum current capability of the load 3 can be set such that the driver can never provide more than e.g. 80% of its maximum power.

In FIG. 1, the example shows that the power supply 1, the load module 2 and the load 3 are all coupled to a voltage reference level also referred to as ground reference. The skilled person will understand that this is not needed or possible for all configurations. When the power regulator 3 is e.g. a buck converter, the load 3 is not coupled to the ground reference. Therefore, the ground refence to the load 3 may be omitted depending on whether the configuration requires a ground reference or not.

In the examples provided, the power regulator 5 is shown as a buck converter, the skilled person will understand that any type of converter can be used for the function of the power regulator 5, such as a boost converter, a buck converter, a buck-boost converter, a fly back converter, resonant converter or a linear current regulator. In its simplest form, the linear current regulator may be a switching element in series with a current limiting resistor.

In the examples provided, the load 3 may be a lighting load. Preferably, the lighting load is a semiconductor lighting load, such as a light emitting diode, LED, or a laser diode.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A load module for connecting to a power supply having a maximum power capability, the load module comprising:

a load;

an input for receiving an input voltage from the power supply;

a power regulator adapted to receive the input voltage and adapted to provide a regulated power to the load;

a current sensor for sensing a current provided by the power supply;

a voltage sensor for sensing the input voltage; and a controller for controlling the power regulator, wherein the controller is arranged to operate in a configuration mode, wherein the controller is arranged to control the power regulator to draw a current from the input that gradually increases until the input voltage drops, wherein the current at which the input voltage drop is indicative of a the maximum power capability of the power supply, wherein the controller is arranged to determine the maximum power capability of the power supply based on the sensed current and the sensed input voltage close to the event that the input voltage drops, wherein the power regulator comprises a current drawing circuit adapted to draw the current from the input that gradually increases until the input voltage drops, such that no current flows through the load during the configuration mode.

2. The load module according to claim 1, wherein the controller is arranged to set a maximum power that can be drawn by the load module at 80% of the maximum power capability of the power supply.

3. The load module according to claim 1, wherein the controller is arranged to operate in the configuration mode when the power supply starts providing the input voltage to the load module.

4. The load module according to claim 1, wherein the current drawing circuit comprises a variable resistor between the input and a return path to the power supply.

5. The load module according to claim 4, wherein the controller is arranged to control a resistance of the variable resistor during the configuration mode and wherein the controller is adapted to prevent any current from flowing through the variable resistor when the controller is operating in a normal operating mode.

6. The load module according to claim 1, wherein the controller comprises a memory adapted to store the maximum power capability of the power supply.

7. The load module according to claim 1, wherein the load is a lighting load.

8. The load module according to claim 7, wherein the lighting load is a semiconductor lighting load.

9. A system comprising the load module according to claim 1 and the power supply.

10. A method for determining a maximum power handling capability of a power supply comprising:

coupling a load module to the power supply such that the load module is adapted to receive power from the power supply;

drawing a current from the power supply;

gradually increasing the current until a voltage provided by the power supply drops below a threshold;

sensing the current using a current sensor;

sensing the voltage using a voltage sensor;

using a controller for controlling a power regulator, wherein the controller is arranged to operate in a configuration mode;

using the controller for determining the voltage and the current provided by the power supply when the voltage drops to determine the maximum power handling capability of the power supply, and using the power regulator for providing a regulated power to a load;

wherein the drawn current gradually increases until an input voltage from the power supply drops, such that no current flows through a load from a power regulator during the configuration mode.

11. The method according to claim 10, wherein a power consumption of the load module is prevented to exceed the maximum power handling capability of the power supply.

* * * * *